(12) United States Patent
Kim et al.

(10) Patent No.: US 9,956,514 B2
(45) Date of Patent: May 1, 2018

(54) AIR FILTER MOUNTING AND DEMOUNTING APPARATUS FOR OVER-THE-RANGE MICROWAVE OVEN

(71) Applicant: SAMSUNG ELECTRONICS CO., LTD., Suwon-si (KR)

(72) Inventors: Kwang Keun Kim, Yongin-si (KR); Jeon Hong Kang, Yongin-si (KR); Sang Won Yun, Seoul (KR); Se Hun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 14/740,496

(22) Filed: Jun. 16, 2015

(65) Prior Publication Data

US 2015/0283489 A1   Oct. 8, 2015

Related U.S. Application Data

(63) Continuation of application No. 13/719,955, filed on Dec. 19, 2012, now Pat. No. 9,079,130.

(30) Foreign Application Priority Data

Dec. 21, 2011   (KR) ........................ 10-2011-0138820

(51) Int. Cl.
*B01D 46/10* (2006.01)
*B01D 46/00* (2006.01)
(Continued)

(52) U.S. Cl.
CPC ..... *B01D 46/0006* (2013.01); *B01D 46/0005* (2013.01); *B01D 46/10* (2013.01); *H05B 6/6426* (2013.01); *B01D 2265/028* (2013.01)

(58) Field of Classification Search
CPC ................. B01D 46/0005; B01D 46/0006; B01D 46/10; B01D 2265/028; B01D 46/00;
(Continued)

(56) References Cited

U.S. PATENT DOCUMENTS 3,654,417 A    4/1972 Javes et al.
4,713,099 A *  12/1987 Schroeder .............. B01D 46/10
                                                          55/385.1
(Continued)

FOREIGN PATENT DOCUMENTS

CN    201203189 Y    3/2009
CN    201706570      1/2011
(Continued)

OTHER PUBLICATIONS

Korean Office Action dated Sep. 22, 2015 in corresponding Korean Application No. 10-2011-0138820.
(Continued)

*Primary Examiner* — Frank Lawrence, Jr.
*Assistant Examiner* — Minh-Chau Pham
(74) *Attorney, Agent, or Firm* — Staas & Halsey LLP

(57) ABSTRACT

An air filter mounting/demounting apparatus for a microwave oven having easy mounting and demounting of the air filter is provided. The apparatus includes a base plate having an inlet port through which air is admitted to serve as a hood, an air filter installed at a position corresponding to the inlet port and configured to filter foreign substances being admitted through the inlet port, an air filter bracket coupled to the base plate, an air filter holder at which the air filter is assembled coupled to the air filter bracket to enable a sliding movement along the guide rail, a latch unit configured to be coupled to the base plate to maintain and release engage-
(Continued)

US 9,956,514 B2

Page 2 ment of the air filter holder aged, and a spring installed at an inside the latch unit to deliver an elastic force to the air filter holder.

26 Claims, 17 Drawing Sheets

(51) Int. Cl.
*F23M 7/00* (2006.01)
*F24C 15/04* (2006.01)
*H05B 6/64* (2006.01)

(58) Field of Classification Search
CPC .. B01D 46/0004; B01D 46/0009; F23M 7/00;
F24C 15/04
USPC .... 55/385.1, 385.6, DIG. 31, 481, 506, 493;
126/200; 219/756, 757
See application file for complete search history.

(56) References Cited

U.S. PATENT DOCUMENTS

| | | | | |
|---|---|---|---|---|
| 5,399,180 A * | 3/1995 | Kopp | ................ | B01D 46/0006 210/445 |
| 6,030,427 A * | 2/2000 | Sorice | ................ | B01D 46/0004 55/480 |
| 6,284,010 B1 * | 9/2001 | Rehmert | ............ | B01D 46/0002 55/385.6 |
| 6,284,011 B1 * | 9/2001 | Chiang | .............. | B01D 46/0005 55/471 |
| 6,641,634 B2 * | 11/2003 | Reich | ................. | B23Q 11/0046 173/207 |
| 7,803,206 B2 * | 9/2010 | Tracy | ................ | B01D 46/0002 361/690 |
| 8,157,881 B1 * | 4/2012 | Anoszko | ............ | B01D 46/0005 55/481 |
| 9,079,130 B2 * | 7/2015 | Kim | ................... | B01D 46/0005 |
| 2003/0074872 A1 * | 4/2003 | Lawlor, Sr. | .......... | B01D 46/001 55/493 |
| 2007/0204847 A1 * | 9/2007 | Lee | ....................... | H05B 6/763 126/200 |
| 2010/0187225 A1 | 7/2010 | Park | | |
| 2010/0200576 A1 * | 8/2010 | Song | .................... | H05B 6/6423 219/756 |

FOREIGN PATENT DOCUMENTS

| | | |
|---|---|---|
| JP | 10-259925 | 9/1998 |
| JP | 2011-206752 | 10/2011 |
| KR | 10-2004-0096970 | 11/2004 |
| KR | 10-2004-0100040 | 12/2004 |
| KR | 20-0383653 | 5/2005 |
| KR | 10-2007-0081667 | 8/2007 |
| KR | 10-0787143 | 12/2007 |
| KR | 10-2008-0070410 | 7/2008 |
| KR | 10-2010-0091684 | 8/2010 |
| KR | 20-2011-0002043 | 3/2011 |

OTHER PUBLICATIONS

Office Action dated Feb. 2, 2016 in Chinese Patent Application No. 201210560753.9.
Notice of Allowance dated Aug. 8, 2016 in corresponding Chinese Patent Application No. 20120560753.9.
U.S. Office Action dated Jul. 8, 2014 in co-pending U.S. Appl. No. 13/719,955.
U.S. Final Office Action dated Nov. 24, 2014 in co-pending U.S. Appl. No. 13/719,955.
U.S. Notice of Allowance dated Mar. 12, 2015 in co-pending U.S. Appl. No. 13/719,955.
U.S. Appl. No. 13/719,955, filed Dec. 19, 2012, Kwang Keun Kim et al., Samsung Electronics Co., Ltd.

* cited by examiner

AIR FILTER MOUNTING AND DEMOUNTING APPARATUS FOR OVER-THE-RANGE MICROWAVE OVEN

CROSS-REFERENCE TO RELATED APPLICATIONS

This is a continuation application of U.S. Ser. No. 13/719,955 filed in the United States on Dec. 19, 2012, now U.S. Pat. No. 9,079,130, which is related to and claims priority to, Korean Patent Application No. 10-2011-0138820, filed on Dec. 21, 2011 in the Korean Intellectual Property Office, the disclosures of which are incorporated herein.

BACKGROUND

1. Field

Embodiments discussed herein relate to an air filter mounting/demounting apparatus for an over-the-range microwave oven having facilitating a mounting and demounting an air filter thereof.

2. Description of the Related Art

An over-the-range microwave oven is a microwave oven installable at an upper portion of a gas range, and configurable to function as a hood to discharge heat and smoke being generated from the gas range to an outside space.

A base plate is installable at a lower portion of the over-the-range microwave oven, and an inlet port is formed at the base plate to discharge the heat and the smoke generated at the gas range.

A filter is installable at the inlet port to purify air by filtering foreign substances mixed in the smoke generated at the gas range.

The filter installed at the inlet port is a component that is needed to be cleaned after a certain period of time, and in a case of mounting/demounting the filter for a cleaning, a finger may be hooked on a filter handle installed at the filter to mount/demount the filter.

When the filter is mounted or demounted by having a finger hooked on the filter handle, the portion of the filter handle may be fragile and easily break. Even a light impact may deform the upper surface and the lower surface of the base place, at which the filter is fastened, and thereby the mounting and the demounting of the filter becomes difficult.

SUMMARY

It is an aspect of the present invention to provide an air filter mounting/demounting apparatus for an over-the-range microwave oven having an easy mount and demount of the air filter with one-touch.

Additional aspects of the disclosure will be set forth in part in the description which follows and, in part, will be obvious from the description, or may be learned by practice of the disclosure.

According to an exemplary an embodiment of the present invention, an apparatus for mounting/demounting an air filter for an over-the-range microwave oven includes a base plate, an air filter, an air filter bracket, an air filter holder, a latch unit, and a spring. The base plate may be provided with an inlet port, through which air is admitted, to serve as a hood. The air filter may be installed at a position corresponding to the inlet port, and configured to filter foreign substances in the in the air being admitted through the inlet port. The air filter bracket may be coupled to the base plate, and provided at an upper portion thereof with a guide rail. The air filter holder may have the air filter assembled thereto, and may be coupled to the air filter bracket so as to enable a sliding movement along the guide rail. The latch unit may be configured to be coupled to the base plate to maintain the air filter holder engaged and to release the air filter holder from being engaged. The spring may be installed at an inside the latch unit to deliver an elastic force to the air filter holder. When the air filter holder that is maintained engaged by the latch unit is released by an external force, the air filter holder may be withdrawn to an outside by the elastic force of the spring in a sliding manner.

A lighting unit may be installed at the base plate to illuminate a lower portion, and a coupling unit to which the latch unit is coupled may be provided at the base plate.

The air filter holder may include an assembly unit at which the air filter is assembled, and a press unit formed at a front surface of the assembly unit while forming an external appearance of the base plate such that a user applies an external force to the press unit.

A guide unit may be provided at both side surfaces of the assembly unit so that the air filter holder moves along the guide rail provided at the air filter bracket in a sliding manner, and a hook that is configured to be maintained engaged by the latch unit and to be released from being engaged is provided at a central portion of a rear surface of the assembly unit.

A guide unit may be provided at both side surfaces of the assembly unit so that the air filter holder moves along the guide rail provided at the air filter bracket in a sliding manner, and a hook that is configured to be maintained engaged by the latch unit and to be released from being engaged is provided at a central portion of a rear surface of the press unit.

When a user applies an external force at the central portion of the press unit, the air filter holder, which is engaged, is released and moved by the elasticity of the spring in a sliding manner to be withdrawn to an outside.

The latch unit may include a latch holder coupled to the base plate, a latch coupled to the latch holder to maintain the air filter holder engaged and to release the air filter holder from being engaged, and a latch cover coupled to the latch holder in a sliding manner to push the air filter holder so that the air filter holder moves in a sliding manner.

The latch cover may be provided with a penetrating hole that the latch passes through to maintain the air filter holder engaged and release the air filter holder from being engaged.

The spring may be coupled in between the latch holder and the latch cover, and a coupling protrusion may be provided at each of the latch holder and the latch cover for a coupling of the spring.

According to an aspect of an exemplary embodiments of the present invention, an apparatus for mounting/demounting an air filter for an over-the-range microwave oven includes a base plate, an air filter bracket, an air filter, and a latch unit. The base plate may have an opening. The air filter bracket may be rotatively coupled to the base plate to open/close the opening, and provided with an inlet port, through which air is admitted, to serve as a hood. The air filter may be coupled to the air filter bracket in a sliding manner, and configured to filter foreign substance in the air being admitted through the inlet port. The latch unit may be coupled to the base plate to maintain the air filter bracket engaged and to release the air filter bracket from being engaged. When the air filter bracket that is maintained engaged by the latch unit is released by an external force, the air filter bracket rotates to a lower side with respect to the base plate to open the opening, and the air filter coupled to the air filter bracket is moved and withdrawn to an outside in a sliding manner.

A lighting unit may be installed at the base plate to illuminate a lower portion, and a coupling unit to which the latch unit is coupled may be provided at the base plate.

A hinge rotatively coupled to the base plate may be provided at both sides of a rear surface of the air filter bracket, and a guide rail may be provided at an upper surface of the air filter bracket so that the air filter moves in a sliding manner.

The base plate may include a hinge coupling unit to which the hinge is coupled, and a rotating angle controlling hole may be provided at the hinge coupling unit to control the rotating angle of the air filter bracket.

A hook configured to be maintained engaged by the latch unit and to be released from being engaged may be provided at both sides of an upper portion of a front surface of the air filter bracket.

The latch unit may include a latch holder coupled to the base plate, and a latch coupled to the latch holder to maintain the air filter bracket to be engaged and to release the air filter holder from being engaged.

According to another aspect of exemplary embodiment of the present invention, an apparatus for mounting/demounting an over-the-range microwave oven includes a base plate, an air filter, an air filter bracket, an air filter holder, a latch unit and a spring. The base plate may be provided with a first inlet port, through which air is admitted, to serve as a hood. The air filter may be installed at a position corresponding to the first inlet port, and configured to filter foreign substance in the air being admitted through the first inlet port. The air filter bracket may be coupled to the base plate, and have a guide rail formed at an upper portion thereof and a second inlet port formed at a position corresponding to the first inlet port. The air filter holder may allow the air filter to be assembled thereto, and may be coupled to the air filter bracket to move along the guide rail in a sliding manner. The latch unit may be coupled to the base plate and configured to maintain an engagement of the air filter holder and to release the air filter holder from being engaged. The spring may be configured to deliver an elastic force to the air filter holder while installed at an inside the latch unit. When the air filter holder that is engaged by the latch unit is released by an external force, the air filter holder may be withdrawn to an outside by the elastic force of the spring in a sliding manner.

A lighting unit may be installed at the base plate to illuminate a lower portion, and a coupling unit to which the latch unit is coupled may be provided at the base plate.

A withdrawal unit may be provided at a front surface of the air filter bracket to withdraw the air filter holder to an outside.

The base plate may include a mounting unit at which the air filter bracket is mounted, and the air filter bracket may include a rotation engagement unit configured to be engaged with the mounting unit and be rotated such that the air filter bracket is coupled to the base plate.

The air filter holder may include an assembly unit at which the air filter is assembled, and a press unit formed at a front surface of the assembly unit while forming an external appearance of the base plate such that a user applies an external force to the press unit.

A guide unit may be provided at both side surfaces of the assembly unit so that the air filter holder moves along the guide rail provided at the air filter bracket in a sliding manner, and a hook configured to be maintained engaged by the latch unit and to be released from being engaged may be provided at a central portion of a rear surface of the assembly unit.

When a user applies an external force at the central portion of the press unit, the air filter holder, which is engaged by the latch unit, may be released from being engaged, and may be moved by the elastic force of the spring in a sliding manner to be withdrawn to an outside.

The latch unit may include a latch holder coupled to the base plate, a latch coupled to the latch holder to maintain an engagement of the air filter holder engaged and to release the air filter holder from being engaged, and a latch cover coupled to the latch holder in a sliding manner to push the air filter holder so that the air filter holder moves in a sliding manner.

The latch cover may be provided with a penetrating hole through which the latch is penetrated to maintain the air filter holder engaged and to release the air filter holder from being engaged.

The spring may be coupled in between the latch holder and the latch cover, and a coupling protrusion may be provided at each of the latch holder and the latch cover for a coupling of the spring.

According to exemplary embodiments of the present invention air filter may be easily demounted and mounted with one touch by a user, thereby enhancing the convenience of the user.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
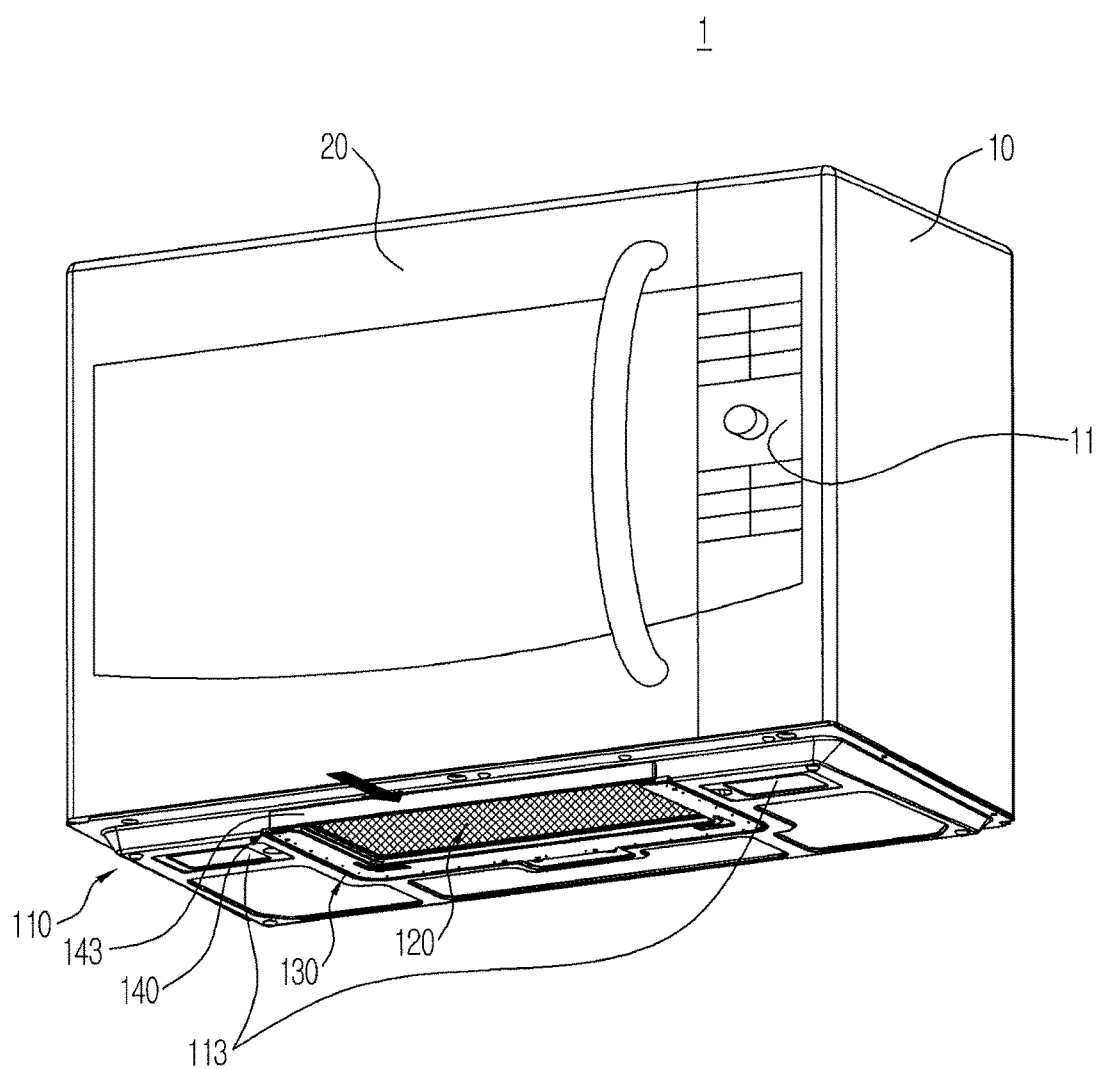
FIG. 1 illustrates an over-the-range microwave oven according to an embodiment of the present invention.
Figure 2:
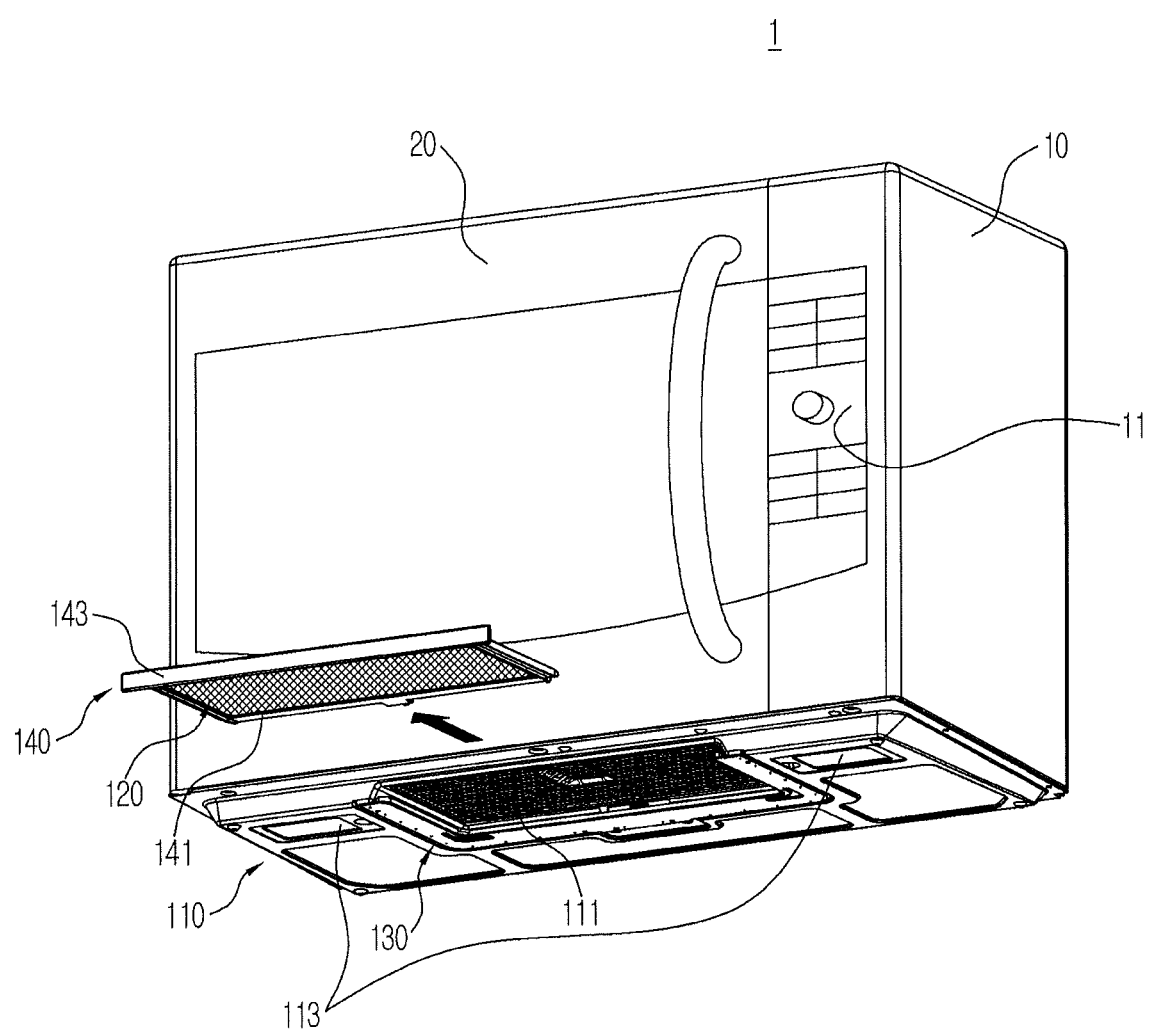
FIG. 2 illustrates an air filter holder being withdrawn from an over-the-range microwave oven according to an embodiment of the present invention.
Figure 3:
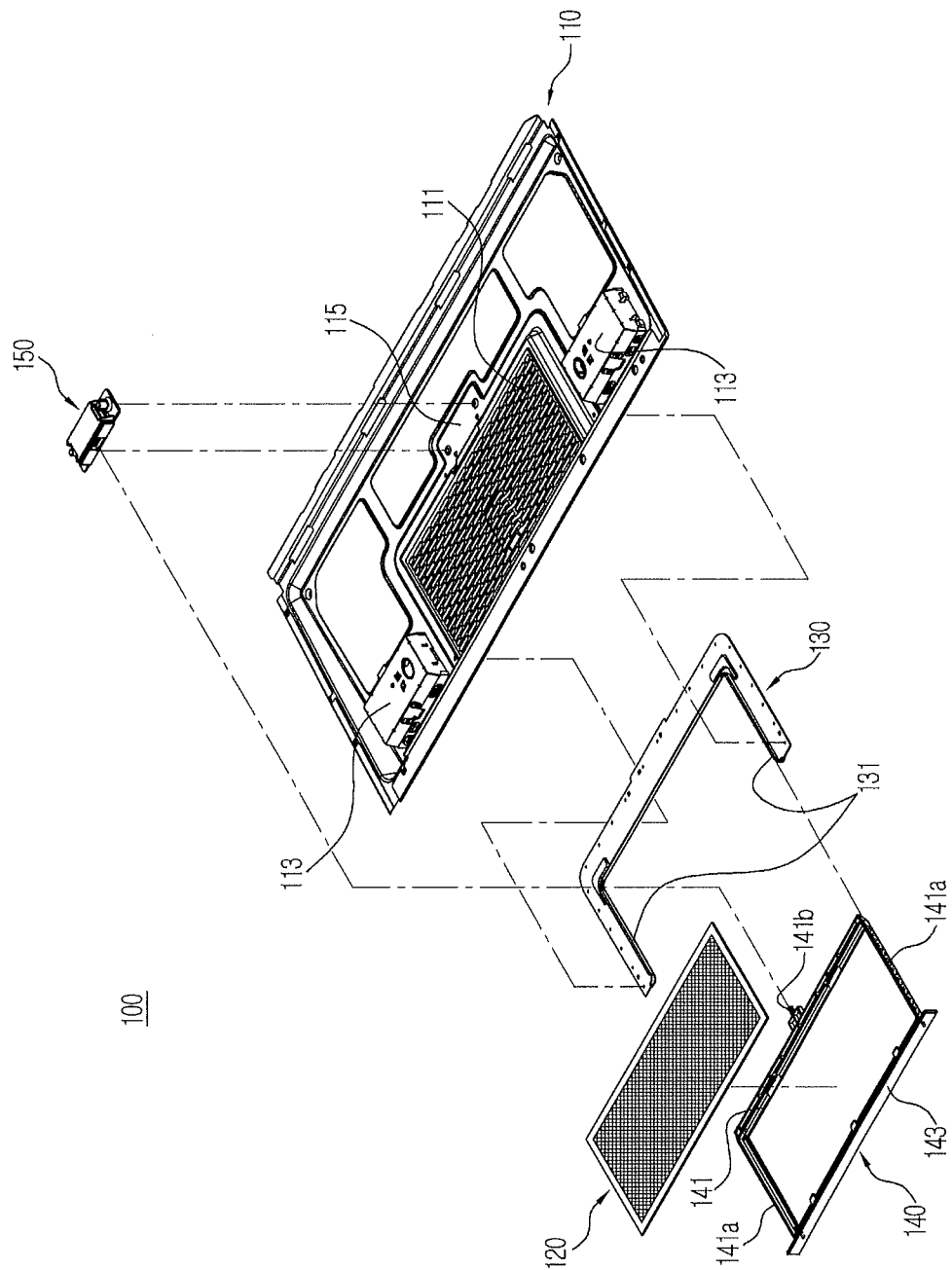
FIG. 3 illustrates an air filter mounting/demounting apparatus for an over-the-range microwave oven according to an embodiment of the present invention.
Figure 4:
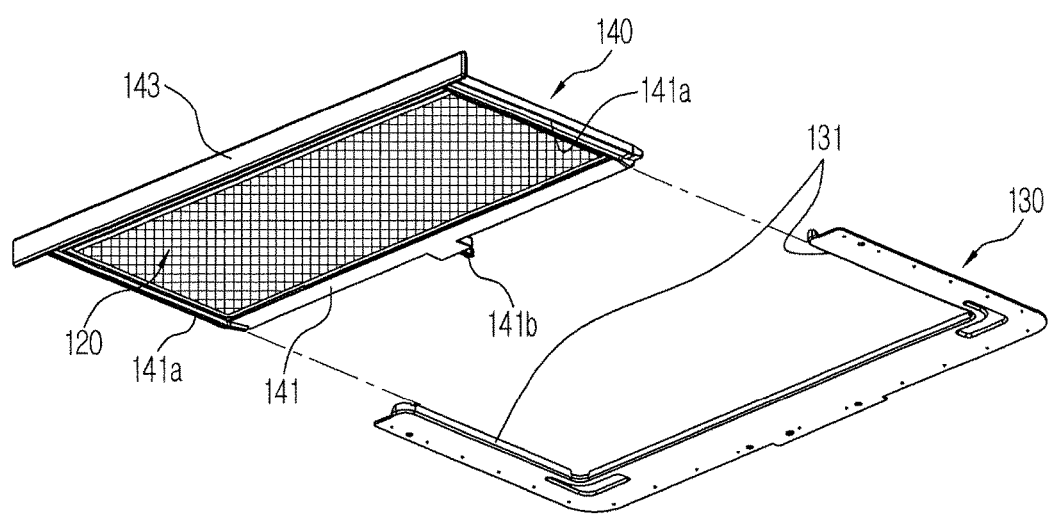
FIG. 4 illustrates an air filter bracket and an air filter holder according to an embodiment of the present invention.

Reference will now be made in detail to the embodiments of the present disclosure, examples of which are illustrated in the accompanying drawings, wherein like reference numerals refer to like elements throughout.

As illustrated on FIG. 1, an over-the-range microwave oven 1 includes a body 10 having a cooking compartment (not shown) where foods may be cooked and an electric compartment (not shown) provided with various electronic apparatuses installed thereto to radiate high frequency wave to the cooking compartment such that foods may be cooked at the cooking compartment, and a door 20 provided at the front of the cooking compartment to open/close the cooking compartment.

A manipulation unit 11 may be formed at the front surface of the body 10 to control the operation of the cooking compartment that is configured to cook foods. A base plate 110 is installed at a lower portion of the body 10. The base plate 110 is provided with an inlet port 111 formed thereto to draw the exhaust gas or the food odor, which is generated from a cooking apparatus, such as a gas range, installed at a lower portion of an over-the-range microwave oven 1 and discharge the drawn gas or odor outdoors.

An air filter 120 is installable at a position corresponding to the inlet port 111 formed at the base plate 110 to purify the air by filtering the foreign substances included in the exhaust gas that is admitted through the inlet port 111.

A discharge port (not shown) may be formed at an upper portion of the body 10 to discharge the exhaust gas or the food odor, which are admitted through the inlet port 111, to an outside space.

An exhaust duct (not shown), through which the exhaust gas or the food odor are being moved, may be installed at an inside the body 10 so that the exhaust gas or the food odor, which are admitted through the inlet port 111 formed at the base plate 110, may be discharged to an outside through the discharge port formed at the upper portion of the body 10.

An air filter mounting/demounting apparatus for an over-the-range microwave oven, which is configured to demount/mount the air filter at a single touch in order to clean the air filter that is configured to purify air by filtering the foreign substance in the air, is described.

As illustrated on FIGS. 1 to 4, an air filter mounting/demounting apparatus 100 for an over-the-range microwave oven according to a first embodiment of the present invention includes the base plate 110 disposed at a lower portion of the over-the-range microwave oven 1 and provided with the inlet port 111, the air filter 120 to filter the foreign substance in the air that is admitted through the inlet port 111, an air filter bracket 130 coupled to the base plate 110 and provided with a guide rail 131 at an upper portion thereof, an air filter holder 140 at which the air filter 120 is assembled, and a latch unit 150 coupled to the base plate 110 to maintain the air filter holder 140 engaged and to release the air filter holder 140 from being engaged.

The base plate 110 is provided with the inlet port 111 installable thereto to inlet the exhaust gas or the food odor being generated from the cooking apparatus such as a gas range installed at a lower portion of the over-the-range microwave oven 1, and also is provided with a lighting unit 113 installable thereto to illuminate the cooking apparatus such as a gas range installable at a lower portion of the over-the-range microwave oven 1.

A coupling unit 115 to which the latch unit 150 is coupled is provided at the base plate 110, and a latch holder 151 of the latch unit 150 may be coupled to the coupling unit 115 of the base plate 110 by a fastening member (not shown).

At a position corresponding to the inlet port 111 of the base plate 110, the air filter 120 may be installed to filter the foreign substance in the air being inlet though the inlet port 111, and the air filter 120 assembled to the air filter holder 140 and mounted at the base plate 110.

The air filter bracket 130 may be coupled to the base plate 120, and the guide rail 131 provided at the upper portion of the air filter bracket 130 so that the air filter holder 140 may be able to move in a sliding manner.

The guide rail 131 provided at the air filter bracket 130 may be provided at various positions according to the number of an assembly unit 141 provided at the air filter holder 140. When the assembly unit 141 of the air filter holder 140 is structured with a single unit thereof, the guide rail 131 is provided at each of the both sides of the air filter bracket 130, and as illustrated on FIGS. 5 to 6, when the assembly unit 141 is structured with two units thereof, the guide rail 131 may be provided to correspond to each side of the two assembly units 141.

The air filter holder 140 includes the assembly unit 141 at which the air filter 120 is assembled, and a press unit 143 formed at the front surface of the assembly unit 141 while forming an exterior of the base plate 110 such that a user may apply an external force.

A guide unit 141a, which is configured so that the air filter holder 140 may be moved in a sliding manner along the guide rail 131 provided at the air filter bracket 130, is provided at both sides of the assembly unit 131, and a hook 141b, which is configured to be engaged by the latch unit 150 and to be released from being engaged, may be provided at the central portion of the rear surface of the assembly unit 141.

Figure 5:
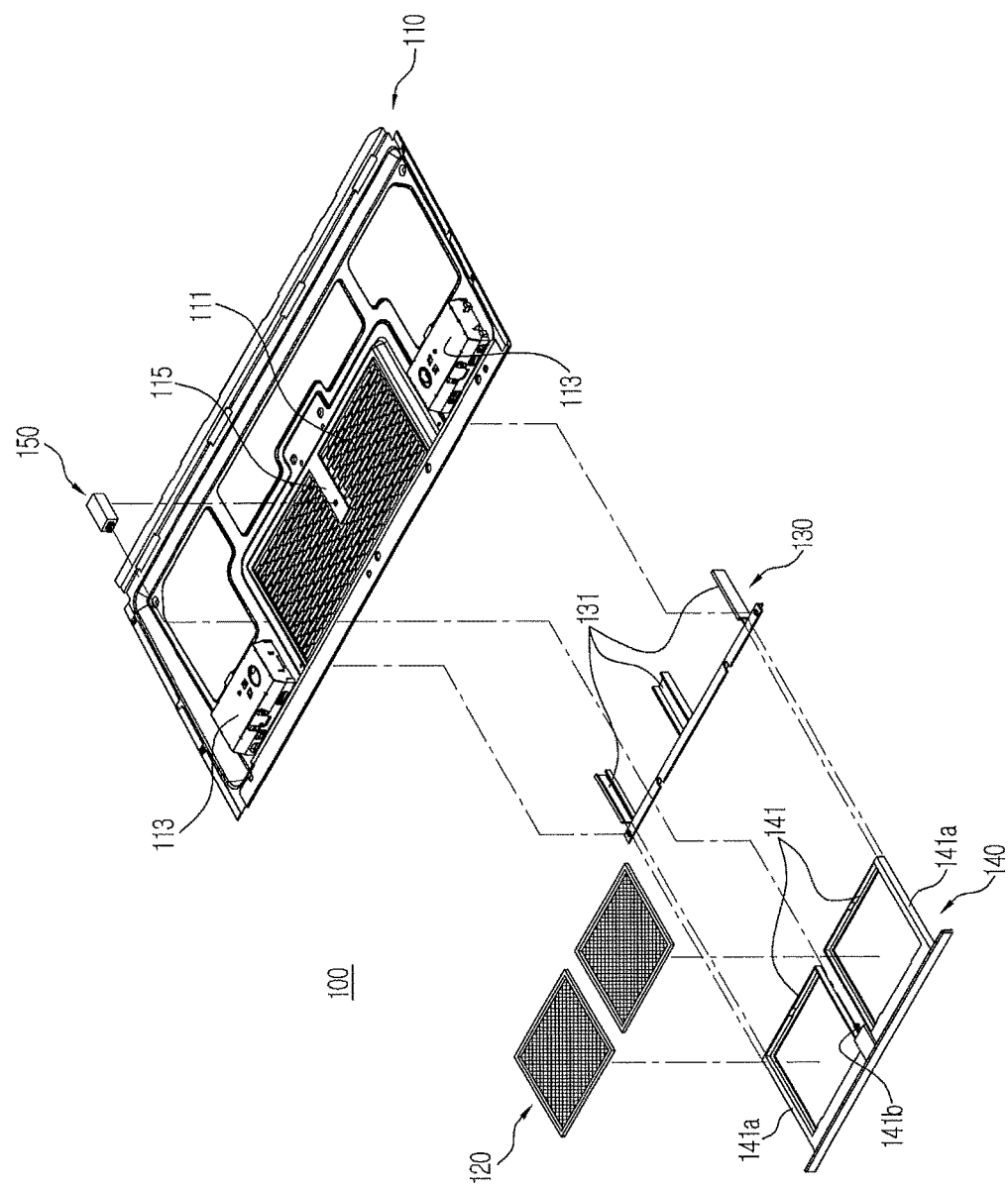
FIG. 5 illustrates an exemplary embodiment of an air filter mounting/demounting apparatus.
Figure 6:
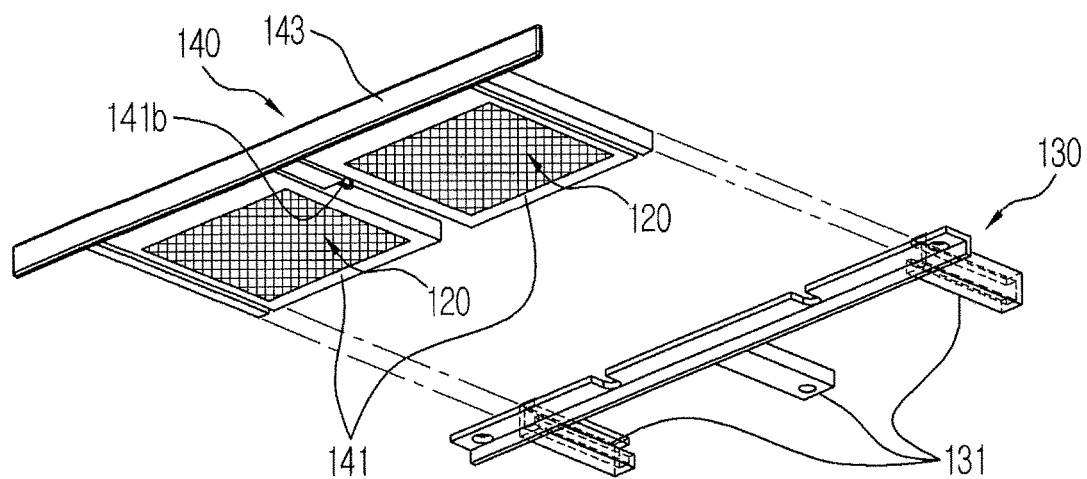
FIG. 6 illustrates an exemplary embodiment of an air filter bracket and the air filter holder.
Figure 7:
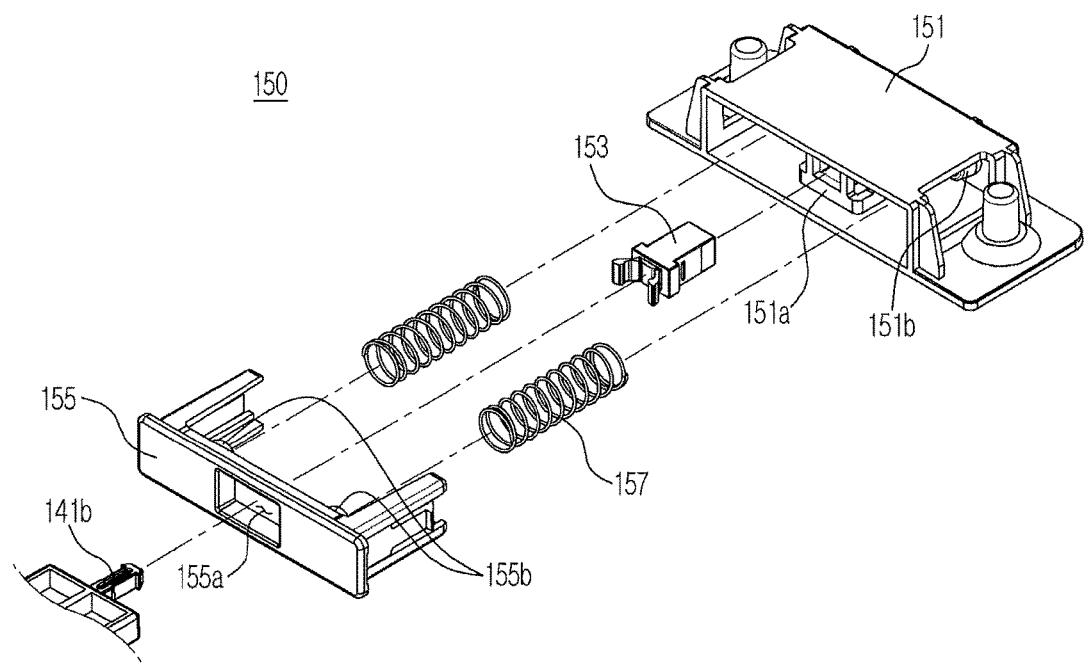
FIG. 7 illustrates a latch unit according to an embodiment of the present invention.
Figure 8:
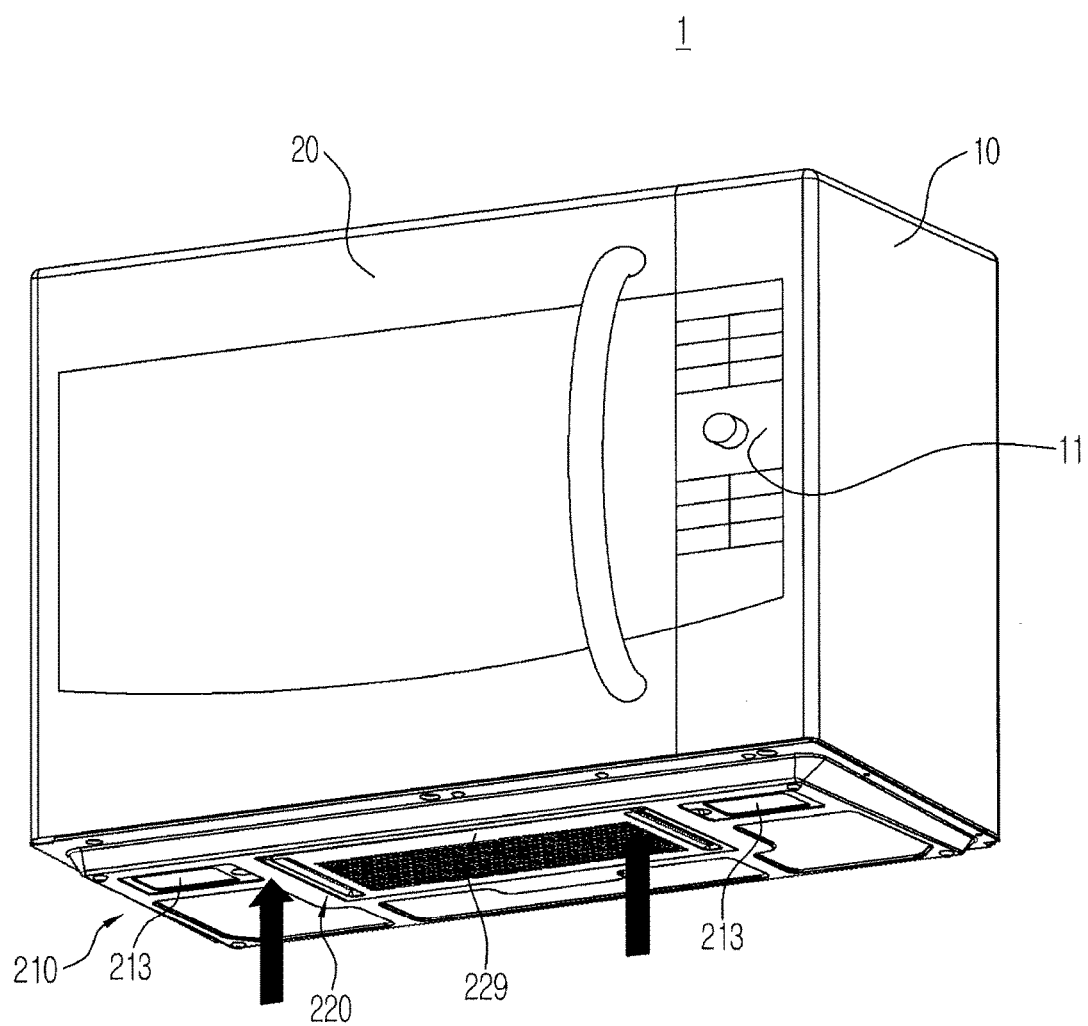
FIG. 8 illustrates an over-the-range microwave oven according to another embodiment of the present invention.
Figure 9:
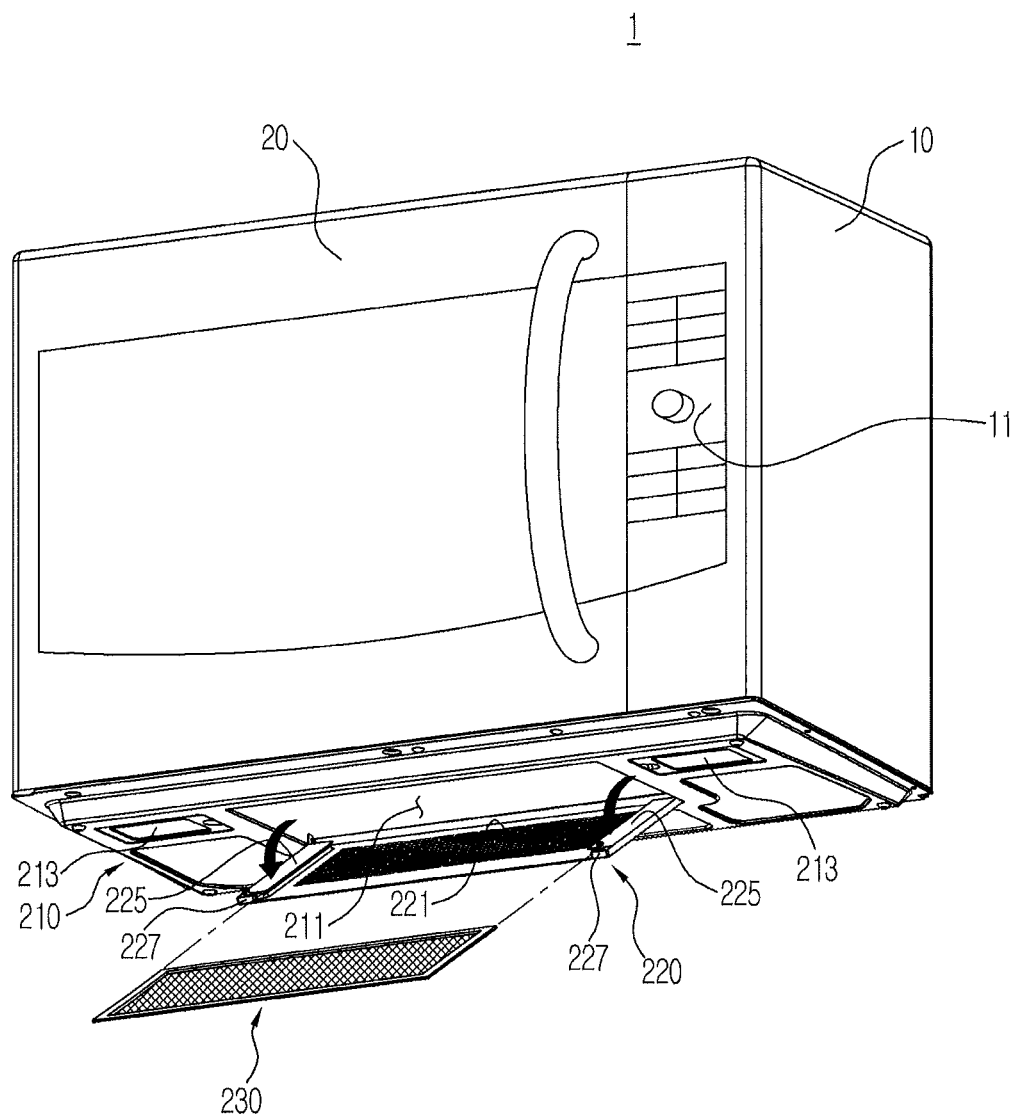
FIG. 9 illustrates an air filter holder being withdrawn from an over-the-range microwave oven.

The assembly unit 141 of the air filter holder 140 may be provided in plurality according to the number of the air filter 120 being assembled to the air filter holder 140, and as illustrated on FIGS. 5 to 6, when the air filter 120 is divided into two units, two assembly units 131 are provided so that the two air filters 120 are assembled to the two assembly units 131, respectively, and the guide unit 141a may be provided at both sides of each of the assembly units 141.

When the assembly unit 141 is structured with two units thereof, the hook 141b may be provided at the central portion of the rear surface of the press unit 143 positioned in between the two units of the assembly unit 141.

The press unit 143 forms an exterior of the base plate 110 for a user to apply an external force, and when a user applies an external force on the press unit 143, the hook 141b provided at the assembly unit 141 may be released from being engaged at the latch unit 150, so that the air filter holder 140 is withdrawn to an outside by being moved in a sliding manner along the guide rail 131 of the air filter bracket 130.

As illustrated on FIGS. 3 to 7, the latch unit 150 may be coupled to the base plate 110, and keeps the hook 141b of the air filter holder 140 engaged, and releases the hook 141b from being engaged.

The latch unit 150 includes a latch holder 151 coupled to the base plate 110, a latch 153 coupled to the latch holder 151 to maintain the air filter holder 140 engaged and to release the air filter holder 140 from being engaged, a latch cover 155 coupled to the latch holder 151 in a sliding manner, and a spring 157 provided in between the latch holder 151 and the latch cover 155 to deliver elasticity to the latch cover 155.

The latch holder 151 may be coupled to the coupling unit 115 of the base plate 110 by a fastening member, and the latch cover 155 may be coupled to the front surface of the latch holder 151 in a sliding manner.

The latch 153 and the spring 157 are installable in between the latch holder 151 and the latch cover 155, and a coupling unit 151a to which the latch 153 is coupled is provided at the latch holder 151, and a penetrating hole 155a through which the latch 153 is penetrated is provided at the latch cover 155.

Coupling protrusions 151b and 155b to which the spring 157 are coupled may bee provided at the latch holder 151 and the latch cover 155, respectively.

A rear end of the latch 153 is coupled and fastened to the latch holder 151, while a front end of the latch 153 penetrates the penetrating hole 155a of the latch cover 155 to keep the hook 141b of the air filter holder 140 engaged and to release the hook 141b of the air filter holder 140 from being engaged.

The spring 157 may be positioned in between the latch holder 151 and the latch cover 155. When the hook 141b of the air filter holder 140 is released from being engaged at the latch 153, the spring 157 delivers elasticity to the latch cover 155, and the latch cover 155 having the elasticity delivered thereto is moved, for example, in a front direction in a sliding manner from the latch holder 151, thereby pushing the air filter holder 140 such that the air filter holder 140 is withdrawn to an outside.

The air filter mounting/demounting apparatus 100 for an over-the-range microwave oven 100 having the structure as the above, the operation of the air filter 120 being demounted and mounted by a single touch of a user is described.

When a user applies an external force to the press unit 143 of the air filter holder 140, the hook 141b of the air filter holder 140, which is maintained at the latch 153 of the latch unit 150 in an engaged manner, is released from being engaged.

When the hook 141b is released from being engaged at the latch 153, by the elasticity of the spring 157, the latch cover 155 is being moved in a front direction in a sliding manner to push the air filter holder 140, and the air filter holder 140 is moved in a sliding manner along the guide rail 131 of the air filter bracket 130 and is withdrawn to an outside the over-the-range microwave oven 1.

When the air filter holder 140 is withdrawn, the air filter 120 is cleaned by separating the air filter 120 from the air filter holder 140.

When the cleaning of the air filter 120 is completed, the air filter 120 is assembled to the air filter holder 140, and then a user applies an external force to the press unit 143 of the air filter holder 140.

By the external force of a user, the air filter holder 140 is moved in a sliding manner along the guide rail 131 of the air filter bracket 130 into an inside of the over-the-range microwave oven 1, and the air filter holder 140, which is inserted into an inside the over-the-range microwave oven 1, pushes the latch cover 155.

When the latch cover 155 is being moved in a sliding manner by the air filter holder 140 toward the latch holder 151, the hook 141b of the air filter holder 140 is engaged by the latch 153 and is kept engaged, and thus the mounting of the air filter 120 is completed.

An air filter mounting/demounting apparatus 200 for an over-the-range microwave oven 200 according to an exemplary embodiment of the present invention includes a base plate 210 disposed at a lower portion of the over-the-range microwave oven 1 and provided with an opening 211, an air filter bracket 220 rotatively coupled to the base plate 210 to open/close the opening 211 and provided with an inlet port 221 through which air is admitted for the function of a hood, an air filter 230 to filter the foreign substance in the air that is admitted through the inlet port 221, and a latch unit 240 coupled to the base plate 210 to maintain the air filter bracket 220 engaged and to release the air filter bracket 220 from being engaged.

The base plate 210 may be provided with the opening 211, which is configured to be open/closed by the air filter bracket 220 installable thereto, and a lighting unit 213 installable thereto to illuminate the cooking apparatus such as a gas range installable at a lower portion of the over-the-range microwave oven 1.

The latch unit 240 may be coupled to the front surface of the opening 211 of the base plate 210, and a hinge coupling unit 217, to which the air filter bracket 220 is rotatively coupled, is provided at the rear surface of the opening 211.

The air filter bracket 220, to open/close the opening 211 of the base plate 210, may be rotatively coupled to the base plate 210, and the inlet port 221 through which air is admitted is provided at the air filter bracket 220.

At a position corresponding to the inlet port 221, the air filter 230 is installable to filter the foreign substance in the air being inlet though the inlet port 221, and the air filter 230 is coupled to the air filter bracket 220 in a sliding manner.

A hinge 223, which is rotatively coupled to the base plate 210, may be provided at each of the both sides of the rear surface of the air filter bracket 220, and a guide rail 225 is provided at the upper surface of the air filter bracket 220 so that the air filter 230 may be moved in a sliding manner, while a hook 227, which is maintained at the latch unit 240 in an engaged manner and is released from being engaged at the latch unit 240, is provided at each of the both sides of the upper portion of the front surface of the air filter bracket 220.

A lower portion of the air filter bracket 220 may include a press unit 229 forming an exterior of the base plate 210 such that a user may apply an external force to the press unit 229.

Figure 11:
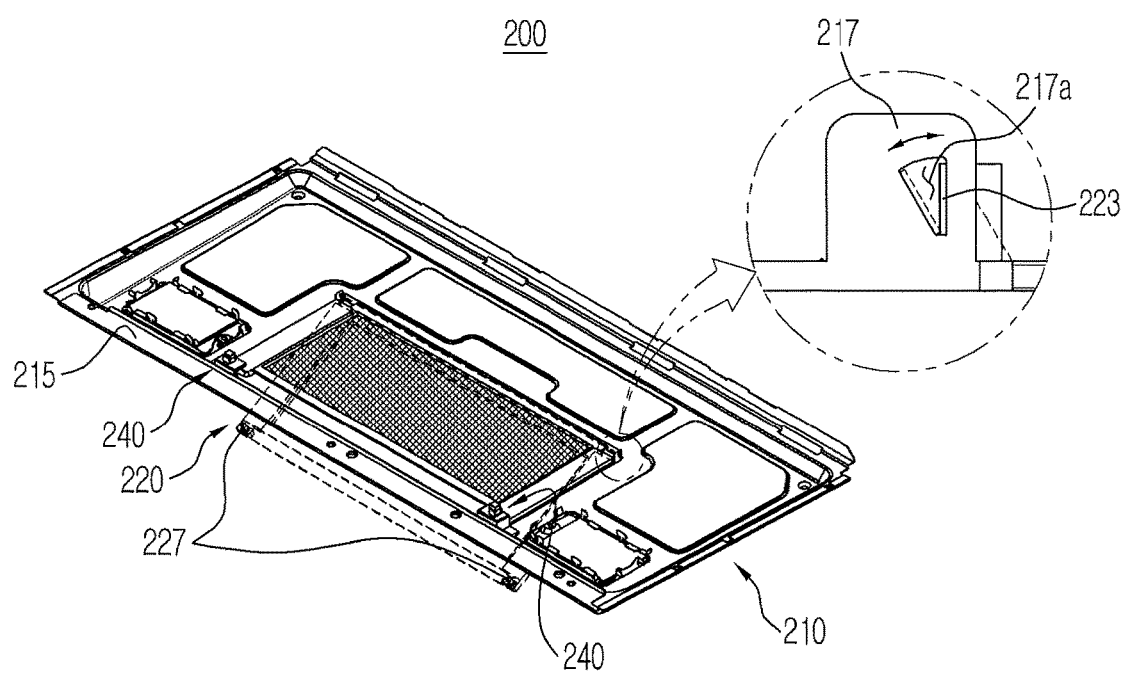
FIG. 11 illustrates a hinge and a hinge coupling unit.

As illustrated on FIG. 11, the hinge 223 of the air filter bracket 220 may be coupled to the hinge coupling unit 217 of the base plate 210, and a rotating angle controlling hole 217a may be provided at the hinge coupling unit 217 to control the rotating angle of the air filter bracket 220.

The hinge 223 of the air filter bracket 220 may be penetratively inserted into the rotating angle controlling hole 217a, and the rotating angle controlling hole 217a is provided to control the moving range of the hinge 223, which is rotated within the rotating angle controlling hole 217a, and to limit the rotation of the air filter bracket 220 when the air filter bracket 220 is being rotated up to a certain portion.

The structure in controlling the rotating angle of the air filter bracket 220 may be variously provided other than the structures illustrated in the drawings.

Figure 10:
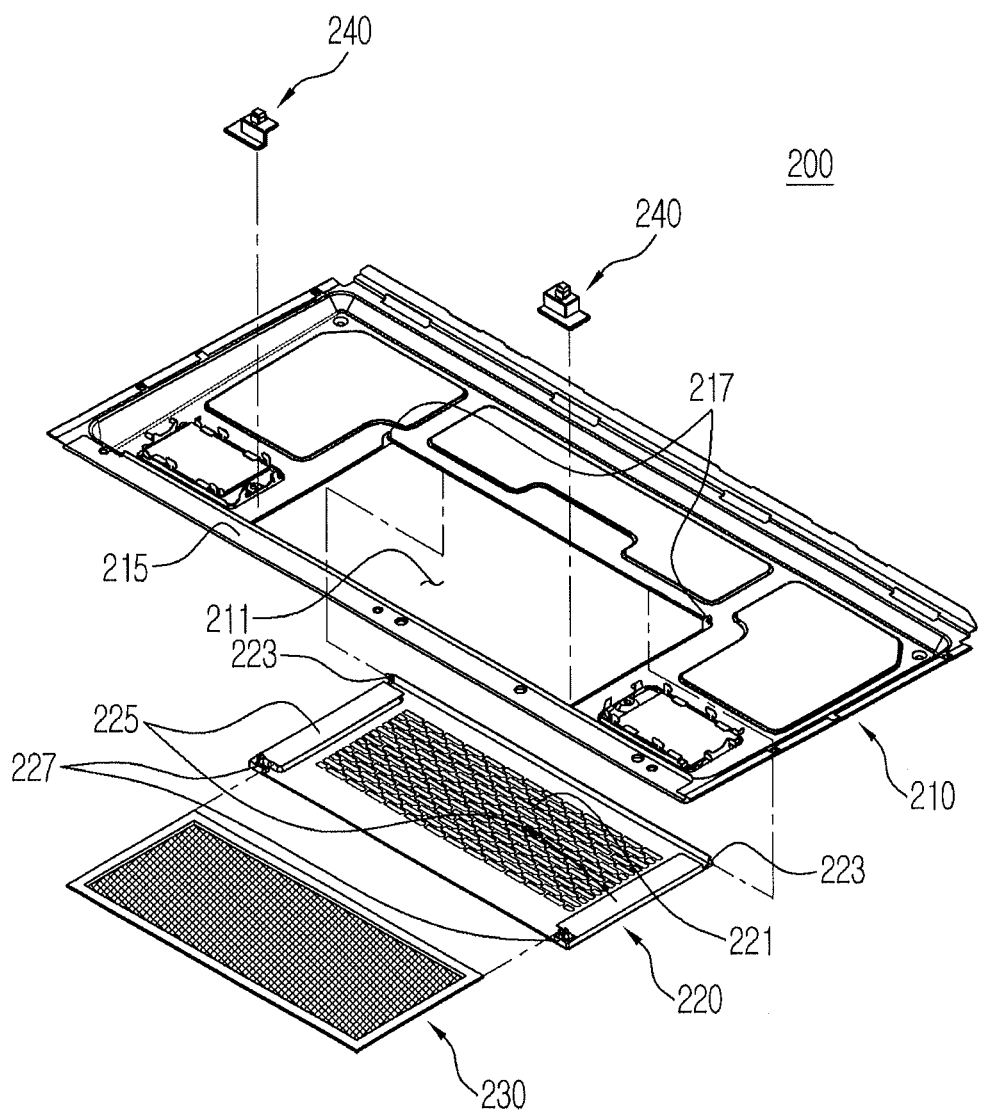
FIG. 10 illustrates an air filter mounting/demounting apparatus for an over-the-range microwave oven.
Figure 12:
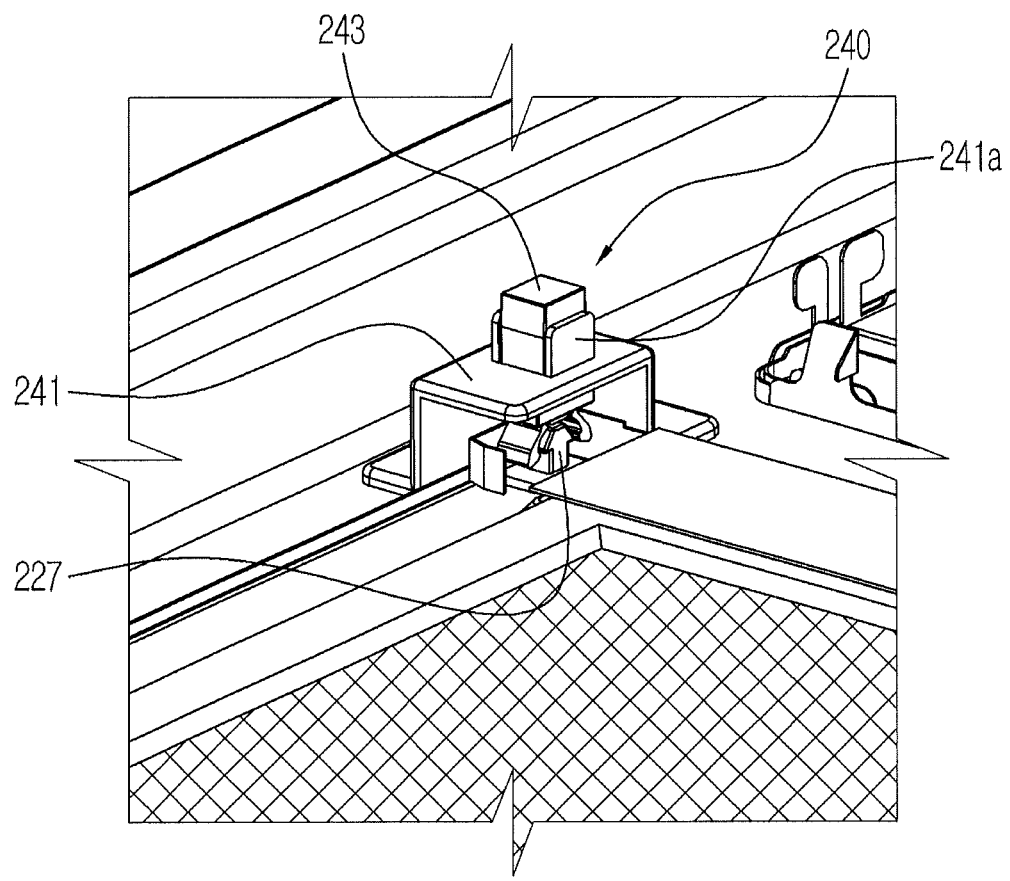
FIG. 12 illustrates a latch unit and a hook.
Figure 13:
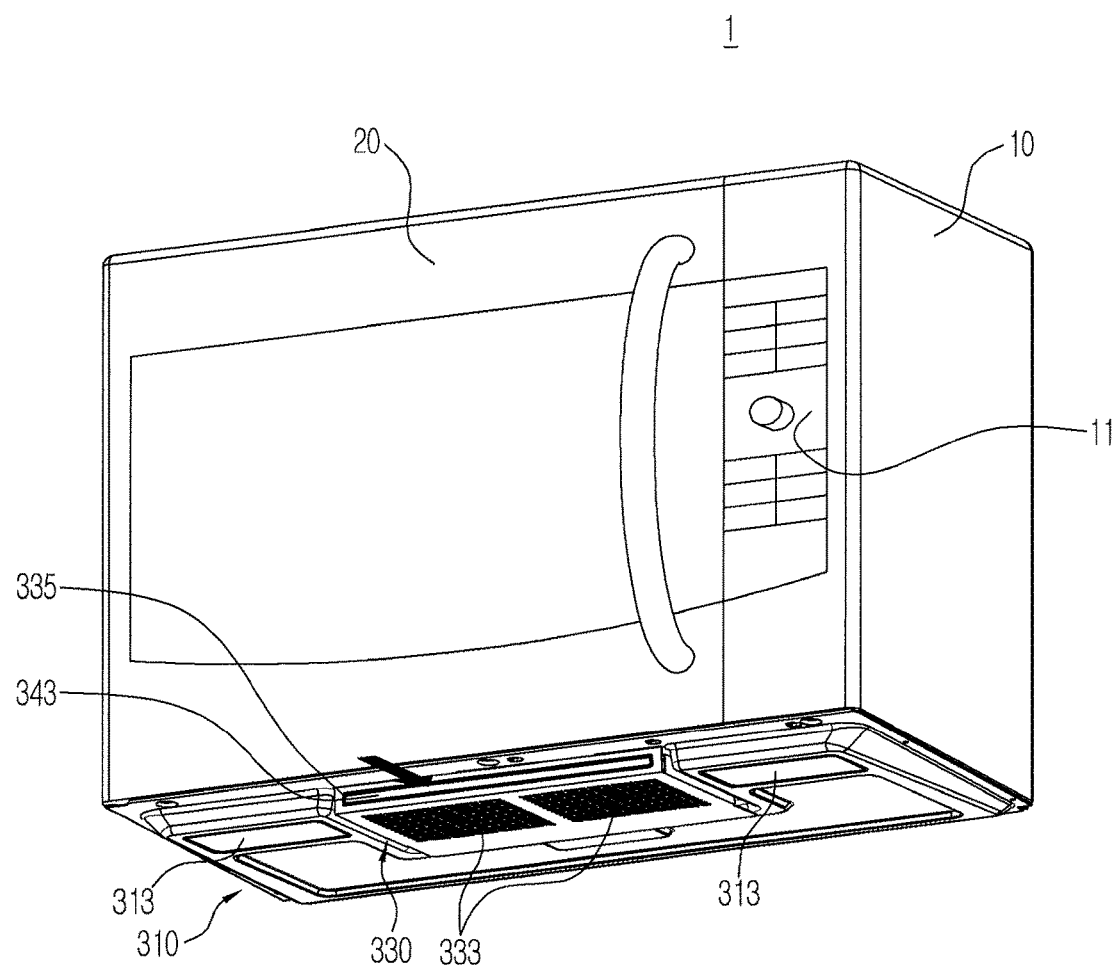
FIG. 13 illustrates an over-the-range microwave oven according to still another embodiment of the present invention.
Figure 14:
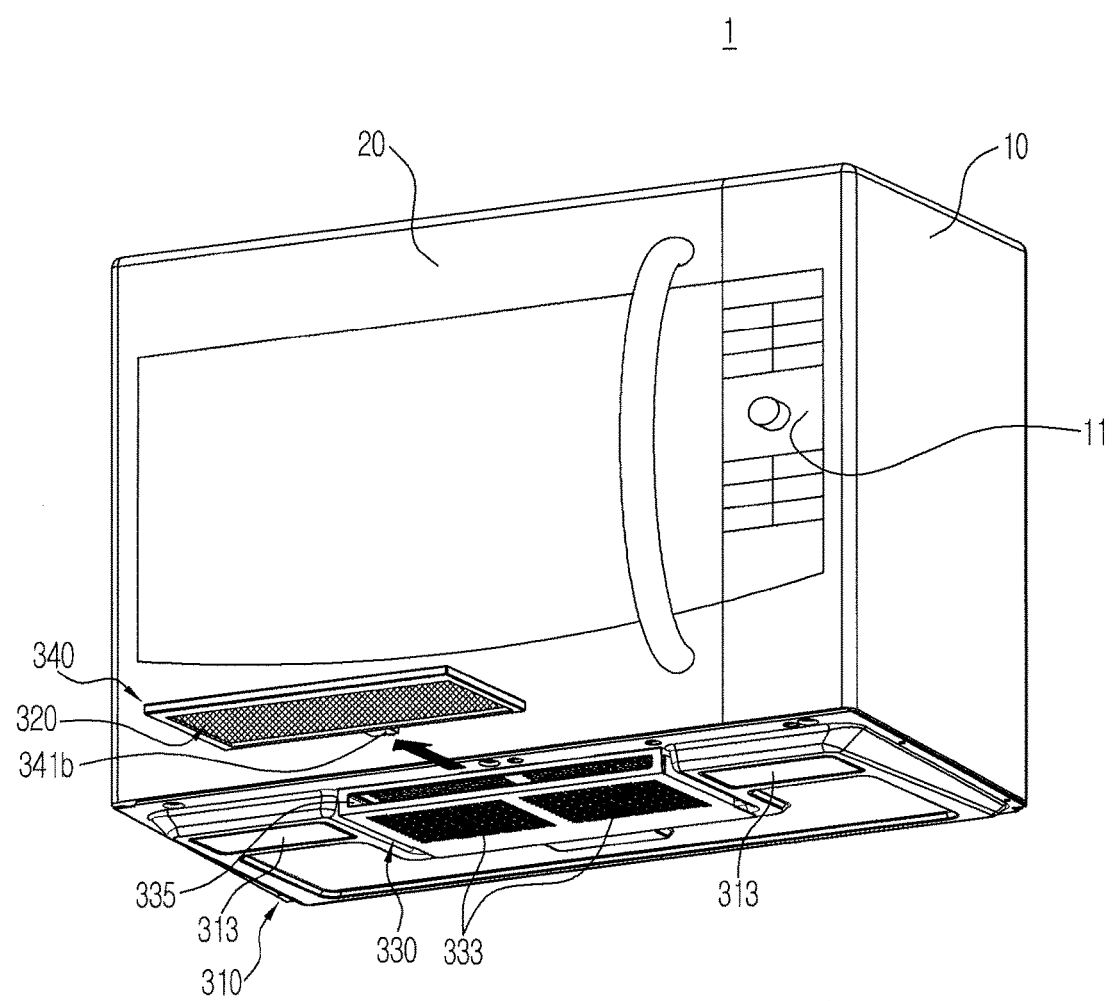
FIG. 14 illustrates an air filter holder being withdrawn from the over-the-range microwave oven.
Figure 15:
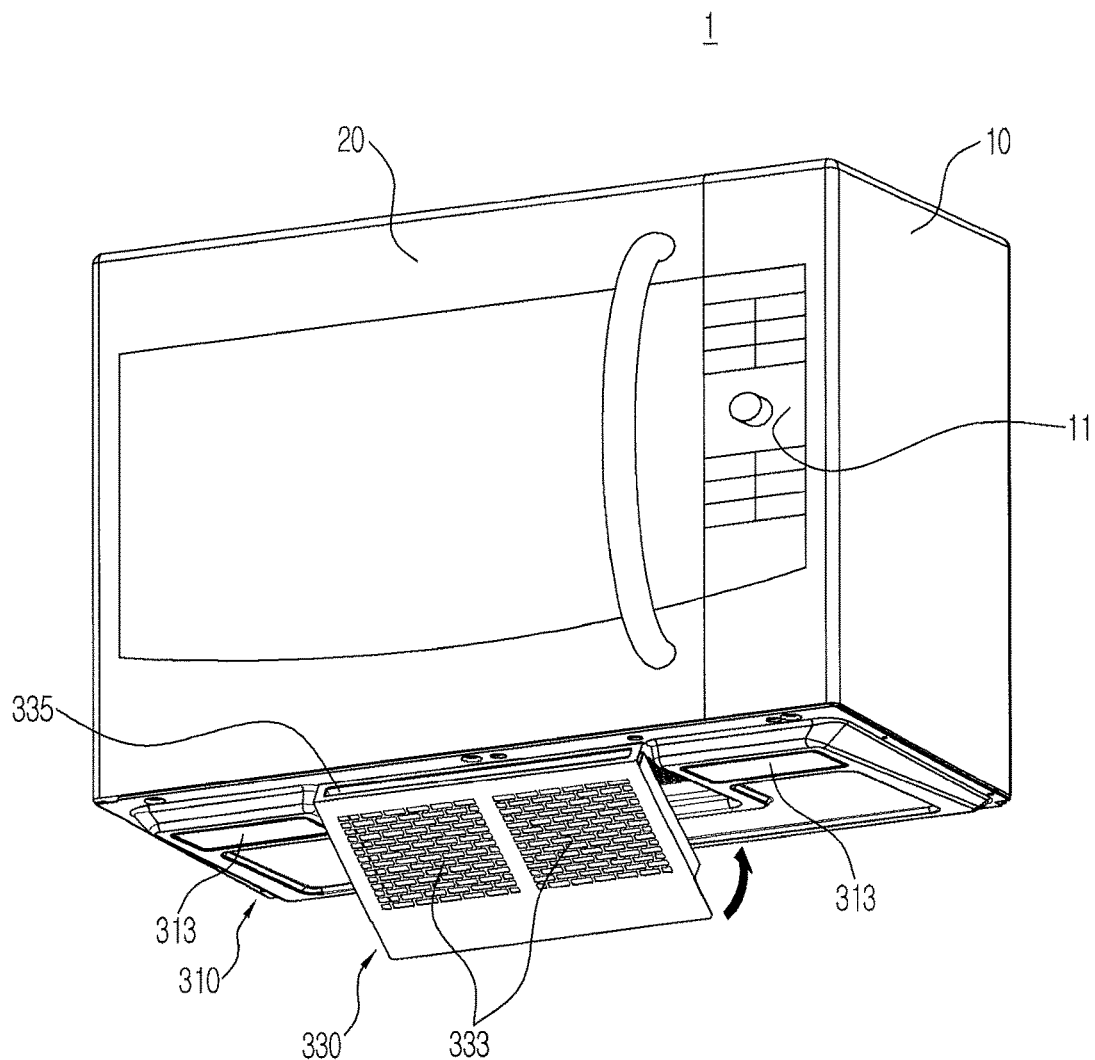
FIG. 15 illustrates an air filter bracket coupled to a base plate.
Figure 16:
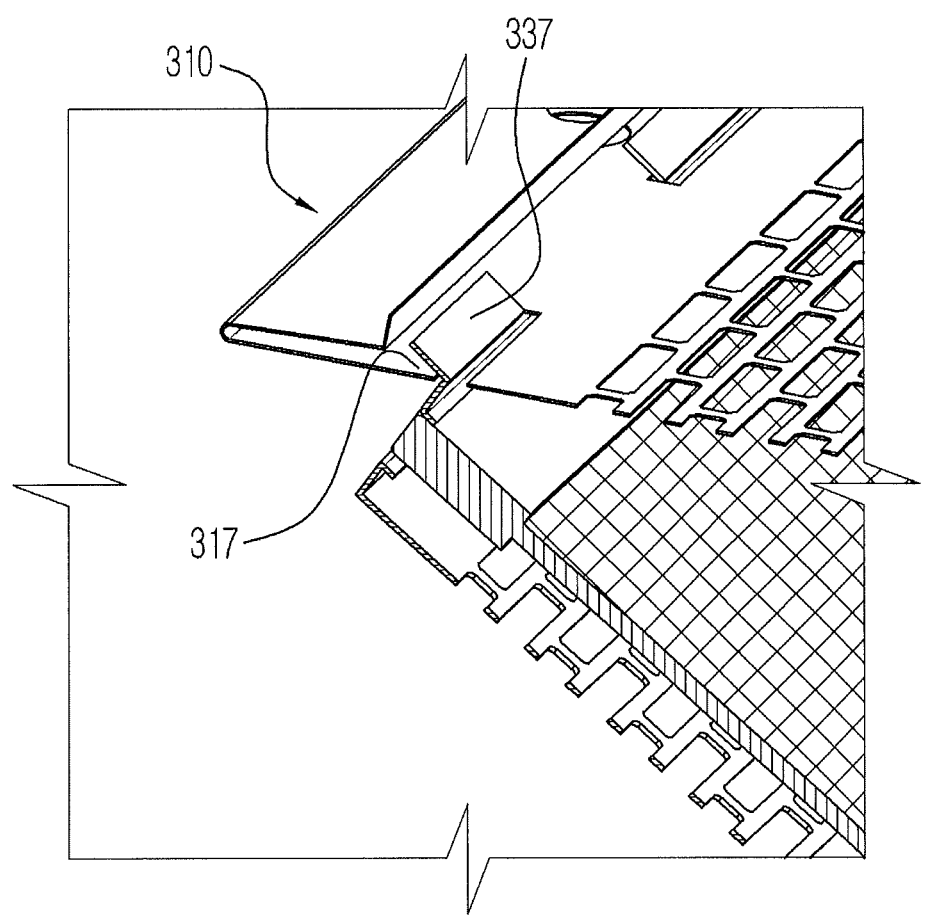
FIG. 16 illustrates an air filter bracket coupled to the base plate.
Figure 17:
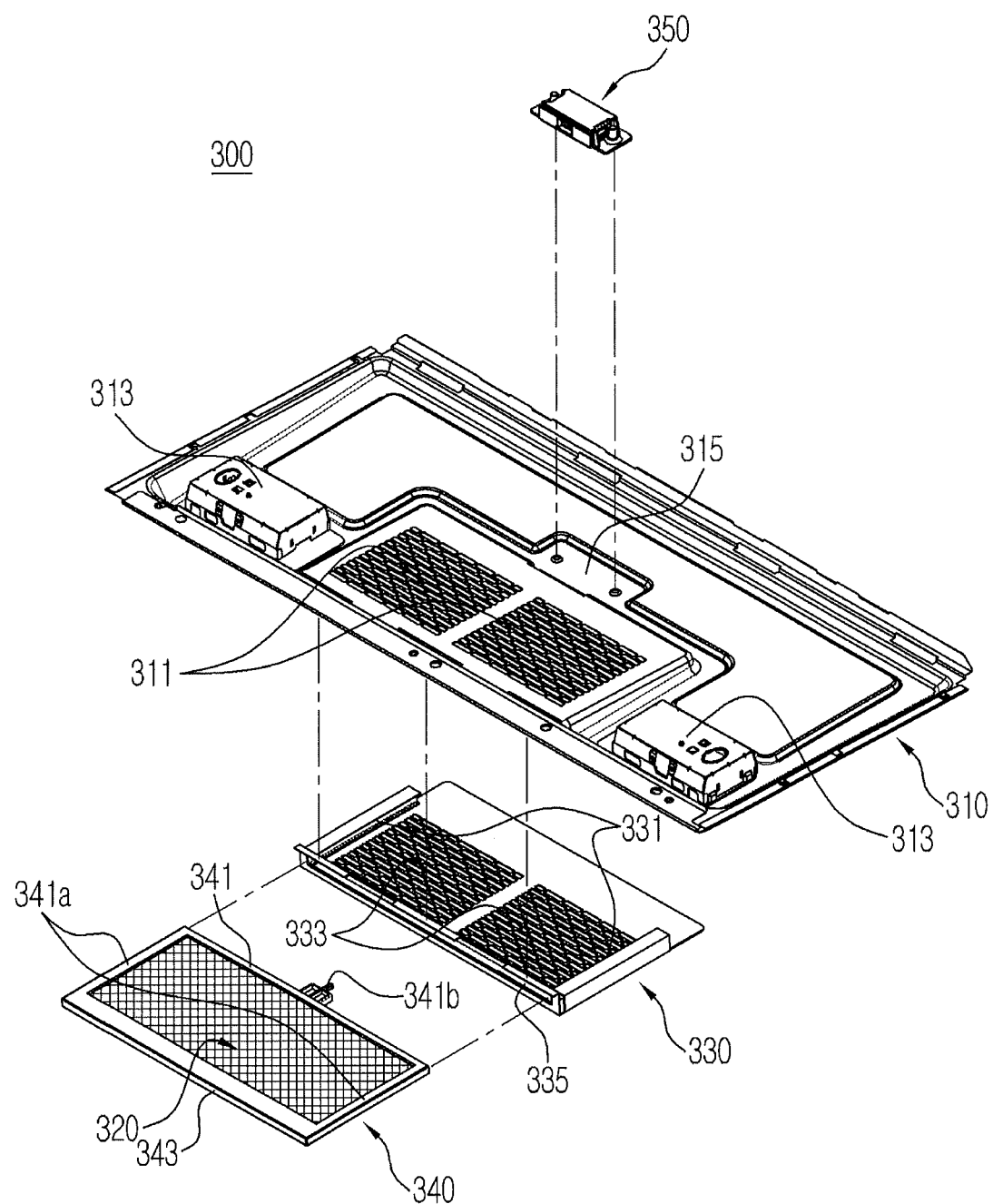
FIG. 17 illustrates an air filter mounting/demounting apparatus for an over-the-range microwave oven.

As illustrated in FIGS. 10 to 12, the latch unit 240 may be coupled to the base plate 210, and keeps the hook 227 of the air filter bracket 220 in an engaged manner and releases the hook 227 of the air filter bracket 220 from being engaged.

The latch unit 240 includes a latch holder 241 coupled to the base plate 210, and a latch 243 coupled to the coupling unit 241a of the latch holder 241 to maintain the air filter bracket 220 in an engaged manner and to release the air filter bracket 220 from being engaged.

An exemplary operation of the air filter 230 being demounted and mounted by a single touch of a user is described.

When a user applies an external force to the press unit 229 of the air filter bracket 220, the hook 227 of the air filter bracket 220, which is maintained at the latch 243 of the latch unit 240 in an engaged manner, may be released from being engaged.

When the hook 227 is released from being engaged at the latch 243, the air filter bracket 220 may be rotated in a lower direction with respect to the base plate 210, to which the air filter bracket 220 is coupled by the hinge 23, and opens the opening 211 of the base plate 210.

In the operation of opening the opening 211 of the base plate 210, since the hinge 223 of the air filter bracket 220 is fixed to the base plate 210 and the press unit 229 of the air filter bracket 220 rotates in a lower direction, the air filter 230 slidably coupled to the air filter bracket 220 is moved in a sliding manner along the guide rail 225 of the air filter bracket 220 toward the press unit 229 of the air filter bracket 220, and is withdrawn from the air filter bracket 220.

After the air filter 230, which is withdrawn, is cleaned, the air filter 230 may be coupled to the air filter bracket 220, and an external force applied to the press unit 229 of the air filter bracket 220.

By the external force of a user, the air filter bracket 220 is rotated, for example, in an upper direction with respect to the base plate 210, to which the air filter bracket 220 is coupled by the hinge 223, and closes the opening 211 of the base plate 210.

In closing the opening 211 of the base plate 210, the hook 227 of the air filter bracket 220 is engaged at the latch 243, and the mounting of the air filter 230 is completed.

As illustrated on FIGS. 13 to 17, an air filter mounting/demounting apparatus 300 for an over-the-range microwave oven according to an exemplary embodiment of the present invention includes a base plate 310 disposed at a lower portion of the over-the-range microwave oven 1 and provided with a first inlet port 311, an air filter 320 to filter the foreign substance in the air that is admitted through the first inlet port 311, an air filter bracket 330 coupled to the base plate 310 and provided at an upper portion thereof with a guide rail 331, an air filter holder 340 at which the air filter 320 is assembled, and a latch unit 350 coupled to the base plate 310 to maintain the air filter holder 340 in an engaged manner and to release the air filter holder 340 from being engaged.

The base plate 310 is provided with the first inlet port 311, which is configured to inlet the exhaust gas or the food odor being generated from the cooking apparatus such as a gas range, and a lighting unit 313 installable thereto to illuminate the cooking apparatus such as a gas range installable at a lower portion of the over-the-range microwave oven 1.

A coupling unit 315 to which the latch unit 350 is coupled is provided at the base plate 310, and a latch holder 351 of the latch unit 350 may be coupled to the coupling unit 315 of the base plate 310.

At a position corresponding to the first inlet port 311 of the base plate 310, the air filter 320 is installable to filter the foreign substance in the air being inlet though the first inlet port 311, and the air filter 320 is assembled at the air filter holder 340 and is mounted at the base plate 310.

The air filter bracket 330 may be coupled to the base plate 310, and the guide rail 331 is provided at an upper portion of the air filter bracket 330 so that the air filter holder 340 may be moved in a sliding manner, while a first inlet port 333 is provided at a position corresponding to the first inlet port 311.

A withdrawal unit 335, which is configured to withdraw the air filter holder 340, is provided at the front surface of the air filter bracket 330, and a rotation engagement unit 337, which is configured to have the air filter bracket 330 to be coupled to the base plate 310 by being engaged to the mounting unit 317 of the base plate 310 and then being rotated, is provided.

The structure of the latch unit 350 and the air filter holder 340 is similar to the structure of the latch unit 150 and the air filter holder 140 of the previously described embodiment.

An exemplary operation of the air filter 320 being demounted and mounted by a single touch of a user is described.

When a user applies an external force to a press unit 343 of the air filter holder 340, a hook 341b of the air filter holder 340, which is maintained at the latch 353 of the latch unit 350 in an engaged manner, is released from being engaged.

When the hook 341b is released from being engaged at the latch 353, by the elasticity of a spring 357, the latch cover 355 is being moved in a front direction in a sliding manner to push the air filter holder 340, and the air filter holder 340 is moved in a sliding manner along the guide rail 331 of the air filter bracket 330 and is withdrawn to an outside the over-the-range microwave oven 1.

When the air filter holder 340 is withdrawn to an outside, the air filter 320 is cleaned by separating the air filter 320 from the air filter holder 340.

When the cleaning of the air filter 320 is completed, the air filter 320 is assembled to the air filter holder 340, and a user applies an external force to the press unit 343 of the air filter holder 340.

By the external force of a user, the air filter holder 340 may be moved in a sliding manner along the guide rail 331 of the air filter bracket 330 through the withdrawal unit 335 of the air filter bracket 330 and is inserted into an inside the over-the-range microwave oven 1, and the air filter holder 340, which is inserted into the inside the over-the-range microwave oven 1, pushes the latch cover 355.

When the latch cover 355 is being moved in a sliding manner by the air filter holder 340 toward the latch holder 351, the hook 341 b of the air filter holder 340 may be engaged at the latch 353 and kept in an engaged state, and thus the mounting of the air filter 320 is completed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An air filter mounting and demounting apparatus for an apparatus, the air filter mounting and demounting apparatus comprising:
   an air filter bracket including a guide rail;
   an air filter holder slideably movable along the guide rail of the air filter bracket to be engaged with the air filter bracket and in which an air filter is mountable and dismountable; and
   a latch configured to keep the air filter holder engaged with the air filter bracket and including an elastic member within the latch configured to deliver an elastic force to the air filter holder to release the air filter holder from being engaged with the air filter bracket;

wherein when the air filter holder that is engaged with the air filter bracket by the latch is released by an external force, the air filter holder is moved to an outside by the elastic force delivered by the elastic member within the latch and the air filter is mountable or demountable on/from the air filter holder in a state that the air filter holder is moved to the outside.

2. The air filter mounting and demounting apparatus of claim 1, further comprising a light to illuminate a portion of the apparatus, and a coupler to which the latch is coupled.

3. The air filter mounting and demounting apparatus of claim 1, wherein the air filter holder comprises:
an assembly at which the air filter is assembled, and
a press structure formed at a front surface of the assembly such that a user applies the external force to the press structure.

4. The air filter mounting and demounting apparatus of claim 3, wherein the assembly including a guide at both side surfaces of the assembly so that the air filter holder moves along the guide rail provided at the air filter bracket in a sliding manner, and a hook that is configured to be maintained engaged by the latch and to be released from being engaged is at a central portion of a rear surface of the assembly.

5. The air filter mounting and demounting apparatus of claim 3, wherein a guide is provided at both side surfaces of the assembly so that the air filter holder moves along the guide rail provided at the air filter bracket in a sliding manner, and a hook that is configured to be maintained engaged by the latch and to be released from being engaged is provided at a central portion of a rear surface of the press structure.

6. The air filter mounting and demounting apparatus of claim 5, wherein when a user applies an external force at the central portion of the press structure, the air filter holder, which is engaged with the air filter bracket, is released and is moved by the elastic force of the elastic member within the latch in a sliding manner to be moved to the outside.

7. The air filter mounting and demounting apparatus of claim 1, wherein the latch comprises:
a latch holder, and
a latch cover coupled to the latch holder in a sliding manner to transmit the elastic force from the elastic member within the latch to the air filter holder so that the air filter holder moves in a sliding manner.

8. The air filter mounting and demounting apparatus of claim 7, wherein the latch cover is provided with a penetrating hole that at least a part of the latch passes through to maintain the air filter holder engaged with the air filter bracket and to release the air filter holder from being engaged with the air filter bracket.

9. The air filter mounting and demounting apparatus of claim 7, wherein a coupling protrusion is provided at each of the latch holder and the latch cover.

10. An apparatus comprising:
a base plate disposed at a lower portion of the apparatus and including an opening;
an air filter bracket couplable to an air filter and rotatively movable to open/close the opening of the base plate, and including an inlet port, through which air is admitted to an inside of the apparatus, to serve as a hood; and
a latch couplable to the base plate to keep the air filter bracket engaged with the apparatus and to release the air filter bracket from being engaged with the apparatus,
wherein when the air filter bracket that is engaged by the latch is released by an external force, the air filter bracket rotates to open the opening of the base plate, and the air filter coupled to the air filter bracket is moved to an outside in a sliding manner.

11. The apparatus of claim 10, wherein the apparatus further comprises:
a light to illuminate a portion of the apparatus; and
a coupler to which the latch is couplable.

12. The apparatus of claim 11, wherein a rear surface of the air filter bracket includes a hinge, and an upper surface of the air filter bracket includes a guide rail so that the air filter is movable in a sliding manner.

13. The apparatus of claim 12, wherein the apparatus further comprises a hinge coupler to which the hinge is couplable, and a rotating angle controlling hole is provided at the hinge coupler to control a rotating angle of the air filter bracket.

14. The apparatus of claim 12, including a hook configured to be maintained engaged by the latch and to be released from being engaged is provided at both sides of an upper portion of a front surface of the air filter bracket.

15. The apparatus of claim 10, wherein the latch comprises a latch holder, and a part of the latch coupled to the latch holder to maintain the air filter bracket to be engaged with the apparatus and to release the air filter holder from being engaged.

16. An apparatus comprising:
an air filter bracket having a guide rail formed at an upper portion thereof;
an air filter holder slideably movable along the guide rail of the air filter bracket to be engaged with the air filter bracket and configured to hold an air filter; and
a latch configured to maintain the air filter holder to be engaged with the air filter bracket and including an elastic member within the latch configured to deliver an elastic force to the air filter holder to release the air filter holder from being engaged with the air filter bracket; and
wherein when the air filter holder that is maintained engaged with the air filter bracket by the latch is released by an external force, the air filter holder is moved to an outside in a sliding manner by an elastic force delivered by the elastic member within the latch and the air filter is mountable and/or demountable on/from the air filter holder in a state that the air filter holder is moved to the outside.

17. The apparatus of claim 16, further comprising a light to illuminate a lower portion, and a coupler to which the latch is couplable.

18. The apparatus of claim 16, wherein a withdrawal structure is provided at a front surface of the air filter bracket to enable the air filter holder to be withdrawn to the outside.

19. The apparatus of claim 18, wherein the air filter bracket includes a rotatable portion.

20. The apparatus of claim 16, wherein the air filter holder comprises an assembly at which the air filter is assembled, and a press structure formed at a front surface of the assembly while forming an external appearance of the base plate to enable a user to apply an external force to the press structure.

21. The apparatus of claim 20, wherein the assembly includes a guide at both side surfaces of the assembly so that the air filter holder moves along the guide rail provided at the air filter bracket in a sliding manner, and a hook configured to be kept engaged by the latch and to be released from being engaged is provided at a central portion of a rear surface of the assembly.

22. The apparatus of claim 21, wherein when a user applies an external force at the central portion of the press structure, the air filter holder, which is kept engaged by the latch to the hook, is released from being engaged, and is moved in a sliding manner by the elastic force delivered by the elastic member to be moved to the outside.

23. The apparatus of claim 16, wherein the latch comprises a latch holder coupled to the base plate, a part of the latch coupled to the latch holder to keep the air filter holder engaged and to release the air filter holder from being engaged, and a latch cover coupled to the latch holder in a sliding manner to transmit the elastic force from the elastic member within the latch to push the air filter holder so that the air filter holder moves in the sliding manner.

24. The apparatus of claim 23, wherein the latch cover includes a penetrating hole through which the latch is penetrated to keep the air filter holder engaged and to release the air filter holder from being engaged.

25. The apparatus of claim 23, further comprising a coupling protrusion at each of the latch holder and the latch cover.

26. An apparatus comprising:
a filter bracket having a guide rail formed at an upper portion thereof corresponding to an inlet port of the apparatus;
a filter holder slideably movable along the guide rail to be engaged with the filter bracket; and
a latch configured to engage the filter holder and including an elastic member within the latch configured to deliver an elastic force to the to release the filter holder,
wherein when the filter holder that is engaged by the latch with the filter bracket is released by an external force, the filter holder is moved in a sliding manner by the elastic force delivered by the elastic member and a gas filter is mountable or demountable on/from the filter holder in a state that the filter holder is moved.

* * * * *